(12) United States Patent
Gambert

(10) Patent No.: US 6,880,251 B2
(45) Date of Patent: Apr. 19, 2005

(54) POWERED TRIMMER

(76) Inventor: Richard L. Gambert, 27 Vernoy Rd., Califon, NJ (US) 07830

( * ) Notice: Subject to any disclaimer, the term of this patent is extended or adjusted under 35 U.S.C. 154(b) by 1 day.

(21) Appl. No.: 10/456,314

(22) Filed: Jun. 6, 2003

(65) Prior Publication Data
US 2003/0226262 A1 Dec. 11, 2003

Related U.S. Application Data
(60) Provisional application No. 60/387,057, filed on Jun. 7, 2002.

(51) Int. Cl.[7] .............................................. A01D 34/67
(52) U.S. Cl. ....................................... 30/296.1; 30/276
(58) Field of Search ............................... 30/276, 296.1, 30/298; D8/8; 56/12.7

(56) References Cited
U.S. PATENT DOCUMENTS

| 712,843 | A | * | 11/1902 | Paul ............................ 173/30 |
| 770,619 | A | * | 9/1904 | Waller ........................ 30/123.5 |
| 907,345 | A | * | 12/1908 | Halfmann ..................... 30/298 |
| 929,173 | A | * | 7/1909 | Stone ......................... 30/123.5 |
| 4,179,805 | A | * | 12/1979 | Yamada ....................... 30/122 |
| 4,996,773 | A | * | 3/1991 | Albertson ..................... 30/121 |
| 5,275,068 | A | * | 1/1994 | Wrench ....................... 74/557 |
| 5,493,782 | A | * | 2/1996 | Gulko ......................... 30/228 |
| 5,661,960 | A | * | 9/1997 | Smith et al. .................. 56/12.7 |
| D391,461 | S | * | 3/1998 | Smoak et al. .................. D8/8 |
| 5,722,169 | A | * | 3/1998 | Ozden ......................... 30/162 |
| 6,006,434 | A | * | 12/1999 | Templeton et al. ........ 30/296.1 |

* cited by examiner

Primary Examiner—Hwei-Siu Payer
(74) Attorney, Agent, or Firm—Michael J. McGreal

(57) ABSTRACT

A powered trimmer unit has been developed for single arm/hand use and without the need to bend over during use. The powered trimmer unit for grass and brush in attached to both a persons upper arm and forearm whereby the trimmer unit becomes an extension of the operator's arm and can readily be manipulated by one arm. This powered unit relieves the level of fatigue in the use of powered trimmer units since it does not require the use of two arms and a bending over during use.

10 Claims, 3 Drawing Sheets

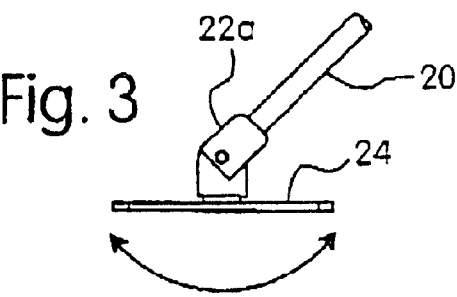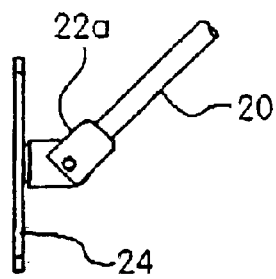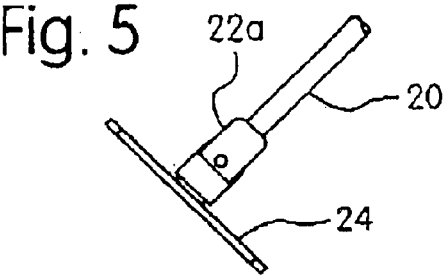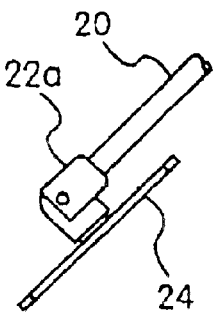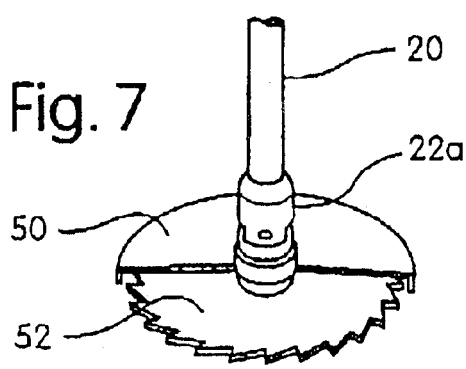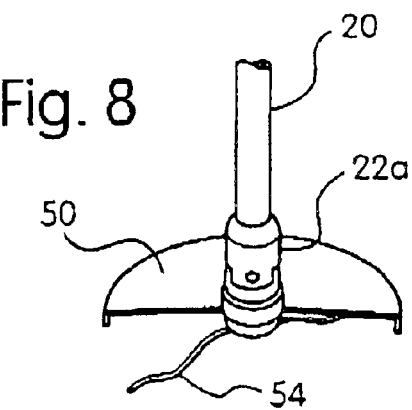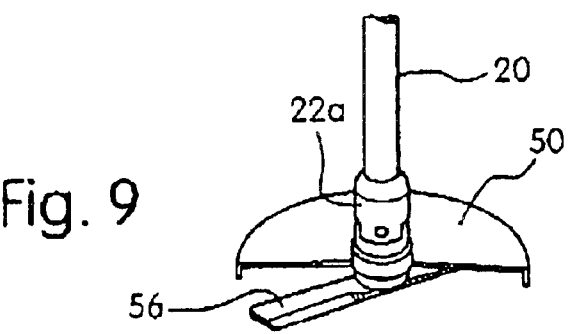

POWERED TRIMMER

This is a priority filing of Provisional Application No. 60/387,057, filed Jun. 7, 2002.

FIELD OF THE INVENTION

This invention relates to powered trimmers for grass, weed and similar plants that require a single hand/arm for control and where the operator can operate the trimmer from an erect position.

BACKGROUND OF THE INVENTION

The present invention relates to a grass, weed and related plant trimmer. Such trimmers come in professional models and models for use by the homeowner. They usually consist of a motor at one end and the cutter/trimmer device at the other end. Usually the cutter is a high speed rotating nylon line. However, the cutter can be a sharpened metal disc or a serrated metal disc. Further, the cutter can be a rotating blade similar to the rotating blade on a conventional powered lawn mower. All of these prior art units require two hands for operation. One hand is adjacent the motor to hold most of the weight of the trimmer and the other hand about 12 to 24 inches in front of that hand to guide the trimmer during use. However, in this two hand gripping, the person operating the trimmer must bend over during use. This is obvious since the guiding arm will be further down the shaft of the trimmer unit. Such a bending over causes fatigue, back aches, and requires the need for more frequent rest periods. This particularly is a problem during commercial operation when an operator will use the trimmer for extended periods.

The present trimmer solves these problems by the unit being operable using one hand/arm for both holding and guiding the trimmer. The other hand is free to hold branches and other items away from the operator. Further with the arrangement of the present trimmer the operator can remain upright.

BRIEF DESCRIPTIONS OF THE INVENTION

The present trimmer can be operated by one hand. This hand both holds and guides the trimmer during use. The trimmer is comprised of a shaft with a motor at one end and a trimmer device at the other end. Adjacent the motor is a first gripping means for gripping the upper arm of the operator, i.e., between the elbow and the shoulder. Adjacent this first gripping means there is a second gripping means on the shaft for gripping the forearm, i.e., the arm between the hand and elbow. These two gripping means provide a way to support the trimmer and in addition provide a way to manipulate the trimmer by making the trimmer an extension of the arm of the operator. By a moving of a single arm the full powered trimmer is manipulated. The other arm is free to perform other functions.

Adjacent the second gripping means there preferably is a handgrip to aid in maneuvering the trimmer. In a yet preferred embodiment, the handgrip includes controls for the trimmer motor and optionally the trimmer device. The motor usually will be a conventional two-stroke small engine but could be a four stroke small engine.

The trimmer device can be a sharpened plate, a serrated plate, one or more rotating blades or can be of the rotating string type. The type of trimmer device is not an essential feature of the present powered trimmer.

Further, the trimmer unit, as an option, can be adjustable with regards to alignment with the shaft. That is, through the use of an adjustable universal joint, the orientation of the trimmer device can be modified to different alignments depending on the terrain that is to be trimmed. This increases the versatility of the trimmer In use, after adjustment of the trimmer device, the trimmer unit is attached through the first gripping means and the second gripping means to the arm of the operator. The motor is started electronically or manually and the operator proceeds to trim vegetation. This trimming of vegetation is all done using one hand and not having to bend over. Having to bend over creates fatigue and is a cause of back problems and due to the increased need for rest periods limits productive worktime.

BRIEF DESCRIPTION OF THE DRAWINGS

FIGS. 3 though 6 show views of different orientations for a universal adjustment means for a trimmer device.

FIG. 7 is a view of a serrated disc trimmer device.

FIG. 8 is a view of a string trimmer device.

FIG. 9 is a view of a blade trimmer device.

DETAILED DESCRIPTION OF THE INVENTION

The invention will be described in more detail as to a preferred embodiment with reference to the enclosed drawings. However, modifications can be made but yet are considered to be within the present concept.

Figure 1:
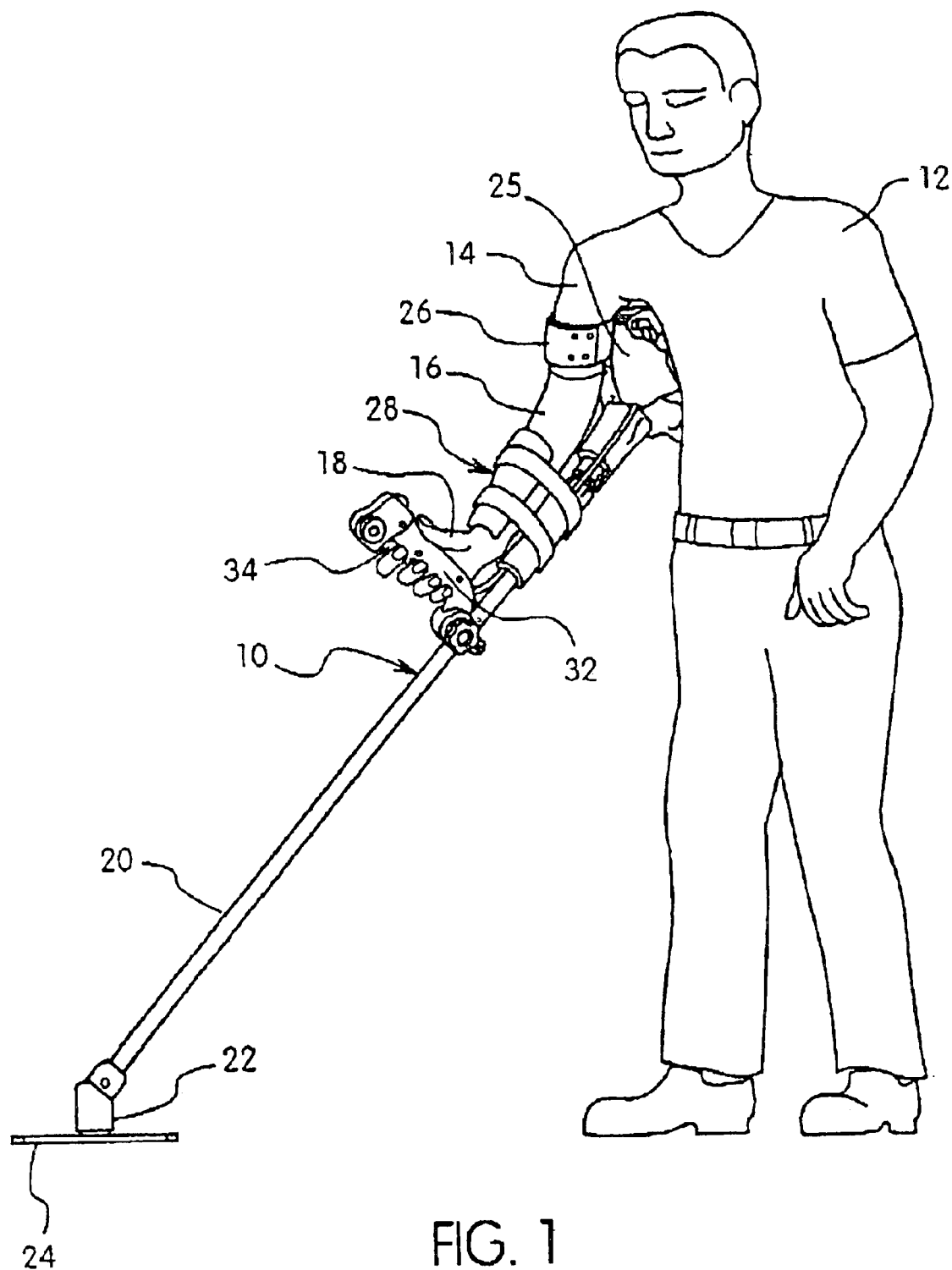
FIG. 1 is a view showing the trimmer unit in use by an operator.

FIG. 1 shows the operator 12 and the trimmer unit 10. The trimmer unit is comprised of shaft 20 with trimmer device 24 at one end and a drive motor 25 at another end. The trimmer unit 10 is mounted to the forearm 16 of the operator by a second gripping means 28 and to the upper arm between the elbow and shoulder 14 by a first gripping means 26. In the region of the operators hand 18 there is a gripping shaft 32 which also can carry a motor control means such as a switch 34 which can increase and decrease the speed of the trimmer unit.

Figure 2:
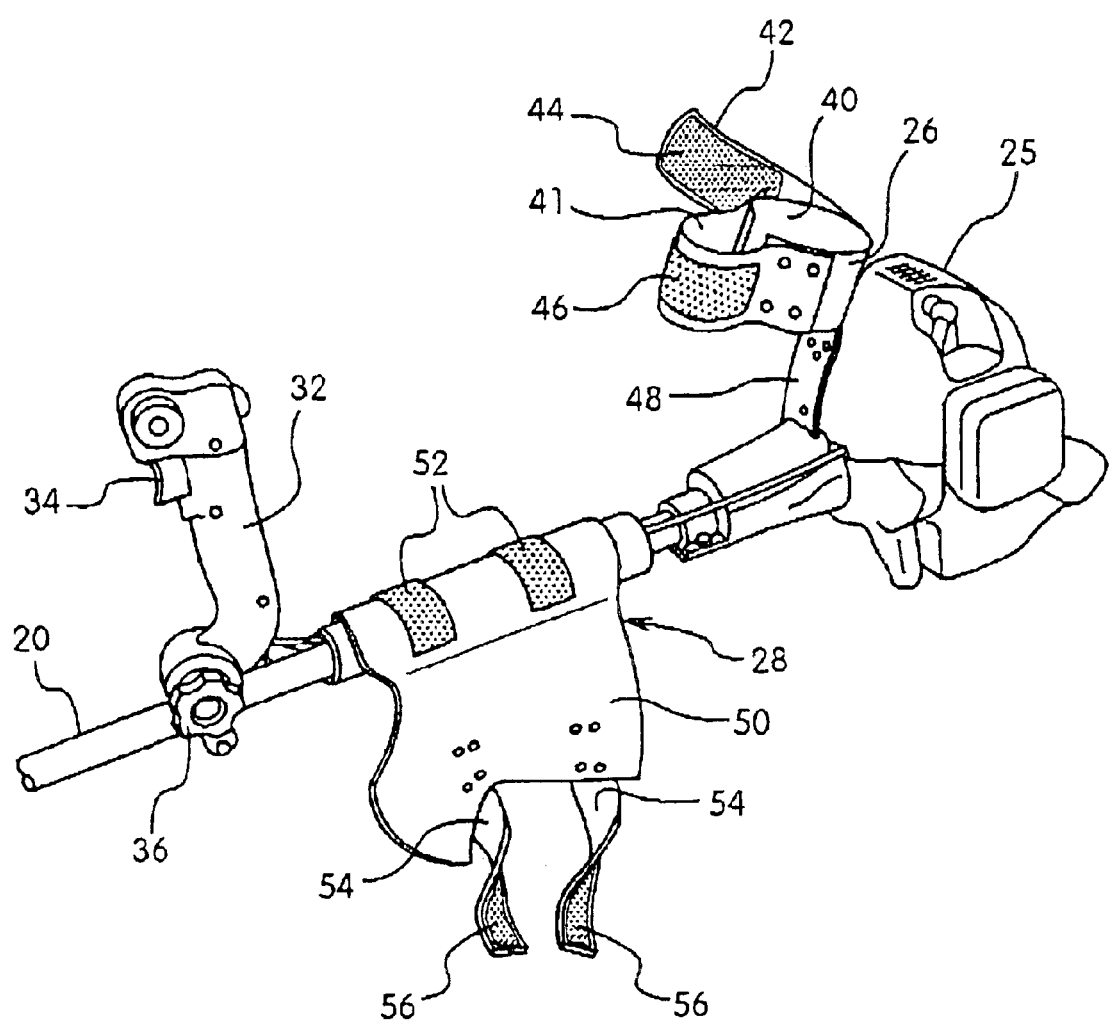
FIG. 2 is a perspective view of the motor end of the trimmer unit.

FIG. 2 shows the sections for mounting of the trimming unit on a person's arm in more detail. Shaft 20 has drive motor 25 at an end. The trimmer unit (not shown) is at the other end. Adjacent the motor 25 is a first gripping means 26. This consists of a semi-rigid cuff 40 and attached straps 41 and 42. This attached strap is adjustable by means of Velcro sections 44 and 46 and strap 41. A person puts his arm into the cuff 40 and adjusts the straps, 41 and 42. The cuff is mounted to the shaft 20 by means of support 48. The cuff can be a semi-rigid to a rigid plastic or metal. In the alternative the cuff can be a flexible fabric similar to an embodiment of the second gripping means.

The forearm is attached to the trimmer device by means of second gripping means 28. This second gripping means is shown as comprised of a flexible material 50 such as a fabric, which is attached to shaft 20. This flexible material carries Velcro strip 52 or its equivalent and straps 54 have a mating Velcro material 56. The flexible material goes over a person's forearm and maintains the forearm in place vis-à-vis the shaft 20. In place of a flexible material this second gripping means can be a semi-rigid to rigid plastic or metal section into which the forearm is inserted. Gripping shaft 32 is gripped by a person's hand. This is adjustable by means of a standard locking unit arrangement 36. This gripping shaft also can carry a control switch 34 for controlling the speed of motor 25.

FIGS. 3 to 6 show an optional universal arrangement 22(*a*) for adjusting the orientation of the trimming device 24. In this way the trimming device can be adjusted to better fit the terrain.

FIG. 7 shows the trimming device as a rotating serrated blade 52 while FIG. 8 shows the trimming device as a rotating string 54. FIG. 9 shows the trimming device as a rotating blade 56. A protective shield for the trimmer device is shown in 50.

In use a persons upper arm is fitted through cuff 40 and straps 41 and 42 tightened. The forearm then is attached to second gripping means 28 by folding flexible material 50 over the forearm and the straps 54 fastened by means of mating Velcro strips 52. The operator grips the handgrip 32 and with assistance starts motor 25. Control button 34 will control the speed of motor 25. The unit is ready for trimming grass, brush and other vegetation.

The trimmer unit can be made from conventional materials. The shaft 20 preferably will be metal with a conventional flexible drive shaft within this shaft 20 to power the trimmer device. The trimmer unit will be used with the operator erect with no need to bend over. Further it requires one arm for use with the other arm free to move branches and other materials out of the way.

I claim:

1. A powered trimmer unit comprising a shaft having a power unit adjacent one end and a trimmer device adjacent another end, said shaft one of directly or indirectly providing a first gripping means to grip an upper arm of an operator and providing a second gripping means to grip the forearm of said operator, the trimmer device forward of the second gripping means and the power unit rearward of the first gripping means whereby the powered trimmer unit can be used with one hand of the operator to trim ground level vegetation while the operator remains upright.

2. A powered trimmer unit as in claim 1 wherein said first gripping means comprises a semi-rigid cuff and at least one flexible strap, said flexible strap tightens around said upper arm of said operator.

3. A powered trimmer unit as in claim 1 wherein said second gripping means comprises a flexible material, which extends over said forearm, at least one adjustment strap securing said flexible material to said forearm.

4. A powered trimmer unit as in claim 1 wherein said first gripping means comprises a semi-rigid cuff and at least one flexible strap, said flexible strap tightens around said upper arm of said operator, and said second gripping means comprises a flexible material which extends over said forearm, at least one adjustment strap securing said flexible material to said forearm.

5. A powered trimmer unit as in claim 1 wherein adjacent said second gripping means there is a hand grip shaft.

6. A powered trimmer unit as in claim 5 wherein said hand grip shaft is an arm adjustably attached to said shaft.

7. A powered trimmer unit as in claim 6 wherein said hand grip shaft has a means for controlling the speed of said power unit.

8. A powered trimmer unit as in claim 1 wherein said trimmer device is a rotating serrated disc.

9. A powered trimmer unit as in claim 1 wherein said trimmer device is a rotating blade.

10. A powered trimmer unit as in claim 1 wherein said trimmer device is a rotating string.

* * * * *